United States Patent [19]

Bax et al.

[11] Patent Number: 4,588,785

[45] Date of Patent: May 13, 1986

[54] APPLICATION OF BLOCK COPOLYESTER AMIDES AS THERMOPLASTIC ADHESIVES FOR TEXTILES

[75] Inventors: Hanns-Jörg Bax, Marl; Gernot Horlbeck, Haltern; Rainer Feldmann; Salih Mumcu, both of Marl, all of Fed. Rep. of Germany

[73] Assignee: Chemische Werke Hüls Aktiengesellschaft, Marl, Fed. Rep. of Germany

[21] Appl. No.: 751,446

[22] Filed: Jul. 3, 1985

[30] Foreign Application Priority Data

Sep. 25, 1984 [DE] Fed. Rep. of Germany ....... 3435053

[51] Int. Cl.⁴ .................... C08F 283/00; C08G 63/76; C08G 69/48; C08L 67/00
[52] U.S. Cl. .................... 525/419; 427/202; 427/207.1; 525/420; 525/425; 525/432; 528/292; 528/308.1
[58] Field of Search ............... 525/419, 420, 425, 432; 528/292, 308.1; 427/202, 207.1

[56] References Cited

U.S. PATENT DOCUMENTS

| | | | |
|---|---|---|---|
| 4,196,108 | 4/1980 | Hinze et al. | 525/420 X |
| 4,345,052 | 8/1982 | Mumcu et al. | 525/420 X |
| 4,345,064 | 8/1982 | Mumcu | 528/292 X |
| 4,349,661 | 9/1982 | Mumcu | 528/292 X |
| 4,483,975 | 11/1984 | de Jong et al. | 525/420 X |

*Primary Examiner*—Lucille M. Phynes
*Attorney, Agent, or Firm*—Wells & Wells

[57] ABSTRACT

Block copolyester amides having improved properties are applied as thermoplastic adhesives to textiles. Their melting points are between 80° and 135° C. and the block copolyester amides are prepared by polycondensing:

(A) 60 to 95% by weight of a block polyester having terminal hydroxy groups and consisting of at least 50 molar % of the acid proportion of terephthalic acid and 40 to 90 molar percent of an alcohol proportion of 1.4-butanediol and 60 to 10 molar percent of 1.6-hexanediol, wherein up to 10 molar percent referred to 1,6-hexanediol can be replaced by aliphatic diols with longer chains; and (B) 40 to 5% by weight of a block polyamide dicarboxylic acid having a mean molecular weight $M_n$ between 1,000 and 8,000 and obtained from omega-amino-carboxylic acids or lactams having 6 to 12 carbon atoms or their mixtures with aromatic or aliphatic dicarboxylic acids.

15 Claims, No Drawings

APPLICATION OF BLOCK COPOLYESTER AMIDES AS THERMOPLASTIC ADHESIVES FOR TEXTILES

CROSS-REFERENCE TO A RELATED APPLICATION

Applicant claims priority under 35 USC 119 for application P No. 34 35 053.5, filed Sept. 25, 1984, in the Patent Office of West Germany.

BACKGROUND OF THE INVENTION

The field of the invention is polyamide adhesives for textiles and the invention is particularly concerned with powdered copolyester amides for heat sealing textiles.

The state of the art of methods and apparatus for depositing powdered thermoplastic adhesive materials on the outer surface to textiles may be ascertained by reference to U.S. Pat. Nos. 4,139,613; 4,183,978; 3,667,422; 4,368,090; 4,459,389; and 4,487,895; and British Patent No. 1,295,558, the disclosures of which are incorporated herein by reference.

Copolyester amides useful as adhesives and the state of the art thereof may be ascertained by reference to U.S. Pat. Nos. 3,849,514; 4,101,524; 4,217,435; 4,219,458; 4,222,976; 4,376,194, and 4,433,117 the disclosures of which are incorporated herein by reference.

The state of the prior art of producing polyamide powders may be ascertained by reference to the Kirk-Othmer "Encyclopedia of Chemical Technology", 2nd Ed., Vol. 16 (1968) under the section "polyamide (plastics)", pages 88–105, particularly page 92, polylauryllactam (nylon-12), and polyundecanamide (nylon-11), page 101, Solution Processes, and Powder Processing, pages 101–102, the disclosures of which are incorporated herein.

According to British Patent No. 1,295,558, the spot coating of interlinings for textiles is carried out mainly by three methods:

1. A suitable plastic powder, for example, a polyamide or polyethylene based powder, is applied by a doctor blade to an engraving roller having recesses in the form of dots disposed in an even raster or grid formation and having a diameter of about 1 mm so that the plastic powder fills the recesses. The web of the interlining, which has been preheated to a high temperature by means of heating rollers, is passed around the engraving roller under tension and the plastics powder is transferred from the recesses to the web of interlining material (Powder point or powder dot process).

2. A network of spots of a suitable plastic, such as polyethylene, is prepared in the form of a raster, the spots being interconnected by very fine webs. The network is applied dry to the hot interlining, the fine webs breaking up and disappearing, and the spots of the plastic fusing to the interlining. Interlinings of this kind have a relatively hard handle and can be fixed only on relatively heavy facing materials and the plastics also tend to bleed through and stick to the fixing press.

3. In the least expensive and least complex process, suitable plastics, such as PVC, polyamide or polyethylene, are mixed with plasticizers or in aqueous or solvent-containing media to form pastes which are printed by means of a printing roller formed with perforations arranged as a raster (paste printing process).

The use of copolyester amides as thermoplastic adhesives is known. Depending on their composition and the type of manufacture, these copolyester amides differ so much in their properties that they must be improved when used as thermoplastic adhesives for textiles.

Thermoplastic adhesives for textiles and containing polyester amides prepared by the method of U.S. Pat. No. 4,101,524 suffer from the drawback that lactam splitting is carried out hydrolytically under pressure, not acidolytically. The polyamide blocks have low sequence lengths, $\overline{M}_n < 1,000$, whereby the melting points are lowered for equal polyamide proportions. Randomly distributed polyester amides are present. These polyester amides are only inadequately resistant to cleaning. Lastly the polyester amides of this state of the art definitely do not contain butanediol, and also they differ in the manner of their preparation because in this state of the art a polyamide technique is used, not a polyester technique.

U.S. Pat. No. 3,849,514 discloses how to prepare block copolyester amides starting from oligoamides having terminal ester and hydroxyester groups and oligopolyesters with terminal hydroxy groups. The application of such block copolyester amides as thermoplastic adhesives is also recommended. However, due to their high melting point, they are unsuitable as thermoplastic adhesives for textiles. Furthermore, such products have two melting points, and when at all suitable as thermoplastic adhesives, they can only be processed with difficulty. Moreover they entail a costly manufacturing procedure due to the use of diamines.

U.S. Pat. No. 4,433,117 discloses block copolyester amides containing piperazine and aromatic dicarboxylic acids such as terephthalic acid in the polyamide block and again terephthalic acid as dicarboxylic acid in the polyester block. Again, these thermoplastic adhesives are unsuitable as thermoplastic adhesives for textiles due to their high melting points.

The copolyester amide molding materials described in U.S. Pat. Nos. 4,219,458 and 4,222,976, aside from having high melting points above 150° C., also necessarily contain aluminum powder and glass fibers. Such mixtures cannot be used as thermoplastic adhesives for textiles because the high bonding temperatures thermally damage the fabrics.

U.S. Pat. No. 4,217,435 discloses mixtures of polyesters and polyamides used as thermoplastic adhesives. The mixtures are obtained from mixtures of melts. The conventionally prepared melt thermoplastic adhesives from those mixtures evince properties different from those of copolyester amides of comparable compositions. Therefore the disclosure of this patent cannot contribute to the development of selected copolyester amides as thermoplastic adhesives for textiles.

U.S. Pat. No. 4,376,194 discloses polyester amides containing benzene dicarboxylic acids and 1,4-butanediol in the polyester portion and omega-undecanoic- and omega-dodecanoic-acid parts, respectively in the polyamide portion. In the method of this patent, the polyamide components are used as monomers, whereby these components are randomly distributed in the polyester amides so made. When used as thermoplastic adhesives for textiles, these products evince inadequate resistance to chemical cleaning. They also differ in that they contain no hexanediol and, therefore, they are adhesive and less crystalline and, accordingly, cannot be used in the powder point process disclosed in British Patent No. 1,295,558. Compared with the block copolyester amides of the present invention, randomly distributed copolyester amides show lesser resistance to cleaning for equal polyamide portions.

SUMMARY OF THE INVENTION

Having in mind the limitations of the prior art it is an object of the present invention to provide thermoplastic adhesives for textiles with good resistance to wash liquids and to cleaning and which can be used to bond especially temperature sensitive textiles.

This object is attained when block copolyester amides are used as thermoplastic adhesives for textiles which have a melting point between 80° and 135° C., a viscosity of solution J between 60 and 120 ml/g in a 0.23% at 25° C. solution of 60 parts by weight of phenol and 40 parts by weight of 1,1,2,2-tetrachloroethane, and which are prepared by polycondensing:

(A) 60 to 95% by weight of block polyester with terminal hydroxy groups in which the acid portion is at least 50 mole percent of terephthalic acid and 0 to 50 mole percent of at least one further aromatic or aliphatic dicarboxylic acid and correspondingly as the alcohol portion 40 to 90 mole percent of 1,4-butanediol and 60 to 10 mole percent of 1,6-hexanediol and, where possible, up to 10 mole percent referred to the hexanediol-1,6 is replaced by aliphatic diols of longer chains; and (B) 40 to 5 percent by weight of a block polyamide dicarboxylic acid, obtained from omega-aminocarboxylic acids or lactams having 6 to 12 carbon atoms or their mixtures and an aliphatic or aromatic dicarboxylic acid having a molecular weight Mn between 1,000 and 8,000.

Preferably the polyamide proportion B is 10 to 30, preferably 20 to 30% by weight and correspondingly the polyester proportion A is 90 to 70, preferably 80 to 70% by weight.

DESCRIPTION OF THE PREFERRED EMBODIMENTS

The acid component in the polyester portion consists of at least 50 and preferably 60, especially 70 mole percent of terephthalic acid. Further applicable dicarboxylic acids are aliphatic dicarboxylic acids having up to 14 carbon atoms such as adipic acid dodecanoic diacid, preferably dodecanoic diacid, aromatic dicarboxylic acids having 8 to 12 carbon atoms such as phthalic acid, isophthalic acid, 2,6-naphthalin dicarboxylic acid, preferably phthalic acid and isophthalic acid. Mixtures of the dicarboxylic acids are also useful, preferably however these dicarboxylic acids are used singly.

The alcohol components consists of 90 to 40, especially 80 to 50 mole percent of 1.4-butanediol and correspondingly of 10 to 60, especially of 20 to 50 mole percent of 1,6-hexanediol, where up to 10 mole percent referred to the 1.6-hexanediol may be replaced by another aliphatic diol having longer chains, for instance 1.8-octanediol or 1.12-dodecanediol. Preferably 1.6-hexanediol is used alone.

The oligoamide dicarboxylic acids are prepared from omega-amino carboxylic acids having 6 to 12 carbon atoms and/or from the corresponding lactams and aliphatic or aromatic dicarboxylic acids. The oligoamide carboxylic acids should have a mean molecular weight Mn between 1,000 and 8,000, preferably between 2,000 and 6,000, especially between 2,000 and 5,600.

Preferably lauryl lactam and/or omega-aminoundecanoic acid are used as lactams or omega-amino carboxylic acid respectively. Again caprolactam, caprylic lactam or other components forming polyamides are useful, possibly also as mixtures with lauryl lactam or aminoundecanoic acid. Preferably lauryl lactam is used alone or jointly with caprolactam, the caprolactam proportion in this mixture preferably being 40 to 20, especially 25 to 20% by weight. In principle the above cited aliphatic or aromatic dicarboxylic acids are useful as the dicarboxylic acids.

Preferred dicarboxylic acids are dodecanoic diacid, terephthalic acid and isophthalic acid.

The oligoamide dicarboxylic acids are prepared apart and used in comminuted form for the proportion of block copolyester amides, or else, they are mixed directly with the polyester precondensate and condensed into the block copolyester amide.

The block copolyester amides are prepared in the manner of the general polyester technique. First a polyester condensate is prepared at 190° to 220° C. under nitrogen by transesterifying dicarboxylic acid dimethylesters with diols and possibly by esterifying further present dicarboxylic acids with the diols. This product then is mixed with an oligoamide dicarboxylic acid of $M_n = 1,000$ to 8,000 which can be prepared from a dicarboxylic acid and a lactam or an omega-amino carboxylic acid, and then is polycondensed at a further elevated temperature under vacuum of less than 20 mbars into a block copolyester amide.

The melting points of the block copolyester amides should be within the range of 80° to 135° C. When the melting point is less than 80° C., the fastness to washing and cleaning is inadequate. When the melting point exceeds 135° C., the adhesives are unsuited to bond delicate textiles.

As the viscosity rises, so do the values of resistance to hydrolysis and cleaning of the block copolyester amides. The desired solution viscosity J is at least 60 ml/g and beyond 90 ml/g, the products become so viscous that the processing into powder and the bonding of the textiles is made difficult. Preferably the values of the solution viscosity are in the range from 60 to 85 ml/g.

The solution viscosity J is measured in a 0.23% solution of 60 parts by weight of phenol and 40 parts by weight of 1,1,2,2-tetrachloroethane at 25° C.

The block copolyester amides may contain conventional additives such as pigments, nucleation agents, stabilizers, reducers and optical brighteners as color improving means.

Typically the products are ground before being used as textile adhesives according to the methods of British Patent No. 1,295,558. For grain sizes less than 80 microns, the powders are normally deposited according to the paste printing process and for grain sizes between 80 and 300 microns, the powders are deposited by the powder point process on the fabric. The powders are homogeneously mixed. The bonding of a fabric containing a textile-adhesive to another fabric as a rule is performed using presses at 130° to 170° C.

The manufacture of the powdered mixtures can be implemented by cold grinding the mixture of granulates and by subsequent grading, as disclosed in U.S. Pat. No. 4,143,025. It is, however, more advantageous to mix powders already ground and to prevent clumping by using aggregates of mixtures which function without shearing and heating.

SPECIFIC EXAMPLES

(A) Preparing the oligoamide dicarboxylic acids

Oligoamide dicarboxylic acid I 9.3 kg of lauryl lactam and 1.2 kg of dodecanoic diacid are agitated at 280° C. under nitrogen for 4 hours. The product so obtained is the oligoamide dicarboxylic acid I ($M_n = 2,010$).

Oligoamide dicarboxylic acid II 10.0 kg of lauryl lactam and 600 g of dodecanoic diacid are agitated for 12 hours at 285° C. under nitrogen. This produces the oligoamide dicarboxylic acid II ($M_n = 4,060$).

Oligoamide dicarboxylic acid III 10.0 kg of lauryl lactam and 600 g of terephthalic acid are stirred for 12 hours at 285° C. under nitrogen. Oligoamide dicarboxylic acid III ($M_n = 2,930$) is formed.

Oligoamide dicarboxylic acid IV 16.2 kg of lauric acid, 500 g of terephthalic acid and 10 g of phosphoric acid are reacted at 280° C. over 6 hours to form the oligoamide dicarboxylic acid IV ($M_n = 5,540$).

(B) Preparing the block copolyester amides

EXAMPLE 1

The composition of the block copolyester amides prepared is shown in Table 1.

Explanation of abbreviations:
BPE—block copolyester with terminal hydroxy groups (A)
BPA—block polyamide dicarboxylic acid (B)
TS—terephthalic acid
BID—1,4-butanediol
HD—1,6-hexanediol
DSC—difference scanning calorimetry (Anal, Chem., Vol. 36, page 1238, [1967]).

As regards the products of Table 1 processed into powders, about 20 g/m² were deposited by means of a powder point machine such as disclosed in U.S. Pat. No. 3,667,422 on a lining material (100% cotton). This cotton material then was bonded to an upper fabric (45% cotton, 55% polyester) by a 15 second compression at a pressure of 3 N/cm² and at a seam temperature of 135° C. The resistance to separation was determined after bonding either in the untreated stabe or after triple washing with commercial detergent or after 5-fold cleaning with perchloroethylene.

The resistance to parting was determined by German Industrial Standard (DIN) 54 310, the values being listed in N/5 cm.

The powder point process used in the examples and comparison examples which follow is carried out according to U.S. Pat. No. 3,667,422 as herein before described as method 1 of British Patent No. 1,295,558.

TABLE 1

| | Polyester Proportion | | | | | Polyamide Proportion | | Solution viscosity | Melting Point |
|---|---|---|---|---|---|---|---|---|---|
| | weight % | Mole Percent | | | | weight % | Oligoamide | J | °C. |
| | of BPE | TS | IS | BID | HD | of BPA | dicarboxylic acid | [ml/g] | (DSC) |
| Example | | | | | | | | | |
| 1 | 90 | 85 | 15 | 70 | 30 | 10 | I | 73 | 128 |
| 2 | 75 | 85 | 15 | 80 | 20 | 25 | I | 70 | 127 |
| 3 | 80 | 85 | 15 | 50 | 50 | 20 | II | 68 | 102 |
| 4 | 80 | 70 | 30 | 80 | 20 | 20 | I | 72 | 113 |
| 5 | 70 | 90 | 10 | 60 | 40 | 30 | III | 63 | 120 |
| 6 | 70 | 90 | 10 | 70 | 30 | 30 | IV | 69 | 127 |
| Comparison Examples | | | | | | | | | |
| A | 70 | 90 | 10 | 100 | — | 30 | III | 65 | 168 |
| B | 70 | 50 | 50 | 100 | — | 30 | III | 67 | 105 |
| C | 70 | 90 | 10 | 60 | 40 | 30 | ω-Aminododecanoic acid | 70 | 100 |
| D | 70 | 90 | 10 | 60 | 40 | 30 | oligoamide dicarboxylic acid with $M_n = 800$ | 63 | 104 |
| E | 40 | 80 | 20 | 60 | 40 | 60 | I | 69 | 128 |

15.52 kg of terephthalic acid dimethylester, 2.34 kg of isophthalic acid, 8.82 kg of 1,4-butanediol and 4.96 kg of 1,6-hexanediol are transesterified or esterified under the catalysis of 5 g of titanium tetraisopropylate over 3 hours at 200° C. under nitrogen. The resulting polyester precondensate then is mixed with 2.36 kg of oligoamide dicarboxylic acid I at 200° C. Following addition of 5 g of titanium tetraisopropylate, the mixture is heated to 240° C. and then is polycondensed in 2 hours at 240° C. at a pressure of 1 mbar. The composition of the block copolyester amide formed is listed in Table 1.

EXAMPLES 2 through 6

The procedure is the same as in Example 1.

TABLE 2

| | Resistance to Separation N/5 cm | | |
|---|---|---|---|
| | After Bonding | After Triple Washing | After 5-fold cleaning |
| Example | | | |
| 1 | 17 | 14 | 13 |
| 2 | 18 | 15 | 15 |
| 3 | 17 | 14 | 14 |
| 4 | 18 | 15 | 15 |
| 5 | 18 | 15 | 14 |
| 6 | 17 | 15 | 15 |
| Comparison Examples | | | |
| A | No bonding | (melting point too high) | |
| B* | 17 | 15 | 12 |

TABLE 2-continued

| | Resistance to Separation N/5 cm | | |
|---|---|---|---|
| | After Bonding | After Triple Washing | After 5-fold cleaning |
| C | 18 | 14 | 10 |
| D | 17 | 12 | 11 |
| E | 15 | 9 | 12 |

B* The powder lumps and adheres to the roller of the powder point machine.

The comparison Examples A and B show that in the absence of 1.6-hexanediol, no useful products are obtained. The comparison Example C, prepared using monomeric omega-aminododecanoic acid, offers an adhering product of low melting point with randomly distributed components, that is, not a block copolyester amide. The comparison Example D makes clear that the oligoamide dicarboxylic acid must have a mean molecular weight $\geq Mn1,000$ and comparison Example E shows that the proportion of the oligoamide dicarboxylic acid may not exceed 40% by weight (% by mass).

We claim:

1. A method of applying powdered block copolyester amides having melting points between 80° and 135° C. and a solution viscosity J between 60 and 120 ml/gram measured at 25° C. in a 0.23% solution of 60 parts by weight phenol and 40 parts by weight of 1,1,2,2-tetrachloroethane as thermoplastic adhesives to textiles comprising:
   (a) carrying out a polycondensation reaction of
      (A) 60 to 95% by weight of a block polyester having terminal hydroxy groups containing as the acid part at least 50 molar percent of terephthalic acid and correspondingly as an alcohol part containing 40 to 90 mole percent of 1,4-butanediol and 60 to 10 molar percent of 1,6-hexanediol; and
      (B) 40 to 5% by weight of a block polyamide dicarboxylic acid, obtained from omega-aminocarboxylic acids or lactams having 6 to 12 carbon atoms or mixtures of omega-aminocarboxylic acids and lactams and aromatic or aliphatic dicarboxylic acids having a mean molecular weight $M_n$ between 1,000 and 8,000;
   (b) grinding the polycondensation reaction product; and
   (c) applying the powdered block copolyester amides as adhesives to textiles.

2. The method of claim 1, wherein up to 10 molar percent of said hexanediol-1,6 is replaced by aliphatic diols having longer carbon chains than said hexanediol-1,6.

3. The method of claim 1, wherein the polyester proportion (A) is 90 to 70% by weight and the polyamide proportion (B) is 10 to 30% by weight.

4. The method of claim 1, wherein the polyester proportion (A) is 80 to 70% by weight and the polyamide proportion (B) is 20 to 30% by weight.

5. The method of claim 4, wherein the acid proportion of component (A) consists of 70 molar percent of terephthalic acid and the alcohol proportion (B) consists of 80 to 50 molar percent of 1.4-butanediol and of to 20 to 50 molar percent of 1,6-hexanediol.

6. The method of claim 1, wherein said powdered block copolyester amides have a grain size of 80 and 300 microns.

7. The method of claim 6, wherein step (c) is carried out according to the powder point process.

8. The method of claim 1, wherein said acid part of component (A) is 0 to 50 molar percent of a different dicarboxylic acid from terephthalic acid.

9. Powdered block copolyester amides having melting points between 80 and 135° C. and a solution viscosity J between 60 and 120 ml/gram measured at 25° C. in a 0.23 percent solution of 60 parts by weight of phenol and 40 parts by weight of 1,1,2,2-tetrachloroethane for application as thermoplastic adhesives to textiles and obtained by polycondensing:
   (A) 60 to 95% by weight of a block polyester having terminal hydroxy groups containing as the acid part at least 50 molar percent of terephthalic acid and correspondingly as the alcohol part containing 40 to 90 molar percent of 1,4-butanediol and 60 to 10 molar percent of 1,6-hexanediol; and
   (B) 40 to 5% by weight of a block polyamide dicarboxylic acid, obtained from omega-aminocarboxylic acids or lactams having 6 to 12 carbon atoms or mixtures of omega-aminocarboxylic acids and lactams and aromatic or aliphatic dicarboxylic acids having a mean molecular weight $M_n$ between 1,000 and 8,000.

10. The powdered block copolyester amides of claim 9, wherein up to 10 molar percent of said hexanediol-1,6 is replaced by aliphatic diols having longer carbon chains than said 1.6-hexanediol.

11. The powdered block copolyester amides of claim 9, wherein the polyester proportion (A) is 90 to 70% by weight and the polyamide proportion (B) is 10 to 30% by weight.

12. The powdered block copolyester amides of claim 9, wherein the polyester proportion (A) is 80 to 70% by weight and the polyamide proportion (B) is 20 to 30% by weight.

13. The powdered block copolyester amides of claim 12, wherein the acid proportion of component (A) consists of 70 molar percent of terephthalic acid and the alcohol proportion (B) consists of 80 to 50 molar percent of 1.4-butanediol and of 20 to 50 molar percent of 1,6-hexanediol.

14. The powdered block copolyester amides of claim 9, wherein said powdered block copolyester amides have a grain size between 80 and 300 microns.

15. The powdered block copolyester amides of claim 9, wherein said acid part of component (A) is 0 to 50 molar percent of a different dicarboxylic acid from terephthalic acid.

* * * * *